3,770,695
CARBANILIC ACID: o-FLUORO-, ALLYL ESTER
Richard A. Nyquist, Midland, and Thomas L. Reder, Bay City, Mich., assignors to The Dow Chemical Company, Midland, Mich.
No Drawing. Filed Sept. 3, 1971, Ser. No. 177,854
Int. Cl. C07c *125/06*
U.S. Cl. 260—47 C  1 Claim

ABSTRACT OF THE DISCLOSURE

A compound corresponding to the formula

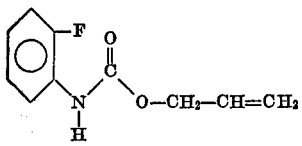

that is, carbanilic acid: o-fluoro-, allyl ester. The preparation and utility of this compound in the control of internal parasites in animals is also disclosed.

BACKGROUND OF THE INVENTION

Homologs and analogs of the compound of the present invention are known; for example see Steinbrunn et al. (U.S. Pat. 3,515,744) where the herbicidal activity of these compounds is disclosed.

SUMMARY OF THE INVENTION

The present invention is concerned with the compound corresponding to the formula

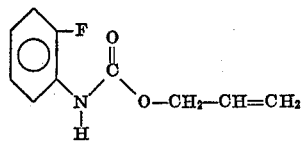

that is, carbanilic acid: o-fluoro-, allyl ester. The preparation and utility of this compound in the control of internal parasites in animals is also taught.

This compound is prepared by reacting appropriate amounts of allyl alcohol and o-fluorophenylisocyanate in the presence of a catalyst such as, for example, pyridine, triethylamine or tripropylamine according to the following reaction scheme:

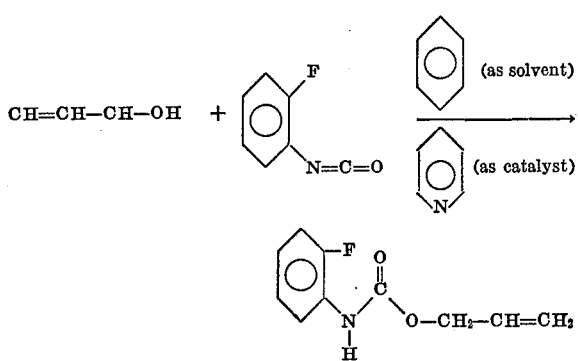

The product is recoverable by well known separation techniques such as, for example, evaporation.

The following example will illustrate the present invention and the manner by which it can be practiced but, as such, should not be construed as a limitation upon the overall scope of the same.

EXAMPLE

A solution was prepared containing 25 milliliters of benzene, 5 drops of pyridine and 4.87 grams of o-fluorophenylisocyanate. Thereafter an excess (5.07 grams) of allyl alcohol was added dropwise and the reaction mixture was stirred for ten minutes. The mixture was next placed in an evaporating dish until the volatile components evaporated, yielding the product.

An infrared spectrum of the yellow liquid residue showed that all of the o-fluoroisocyanate had reacted to form carbanilic acid: o-fluoro-, allyl ester. The sample showed no IR spectral evidence for the presence of pyridine, benzene or allyl alcohol.

The compound of this invention is employed as a toxicant in the control of internal parasites in animals. For such use the compound can be administered in a therapeutic dose, or dose sufficient to control the parasite. The compound can be given to the animal either orally or as intramuscular injections; if desired, the compound can be administered in multiple doses over a period of a number of days.

The oral administration of the compound can be accomplished by giving it directly or in a liquid drench, powder, mash, pellet, bolus or other animal feed composition containing the compound. In such usage, the compound may be modified with one or a plurality of additaments or innocuous ingestible adjuvants such as gelatin, water, ethanol, skimmed milk, syrups, edible oils, surface active dispersing agents such as the liquid and solid dispersing or emulsifying agents; and edible solid carriers such as edible powders, mineral and vitamin supplements and commercial feeds, concentrates and supplements.

The exact concentration of the compound to be employed in the compositions may vary provided that a sufficient amount of the composition is administered to the animal so as to provide the required dosage of active agent. The exact amount of the compound to be incorporated into a feed composition, for example, is dependent upon the feeding habits of the animals concerned.

In the preparation of solid feed compositions, the compound of the present invention can be mechanically mixed with a finely divided edible solid such as flour or animal feed or a solid surface active dispersing agent such as finely divided bentonite, fuller's earth or attapulgite. Alternatively, the compound can be dissolved in an organic solvent, the resulting mixture dispersed in an animal feed and the feed dried to remove the solvent. Also the compound can be dispersed in an edible oil such as coconut oil, olive or peanut oil and the resulting mixture dispersed in the feed. The edible oil can contain one or more surface active agents such as, for example, glycerol and sorbitan esters of fatty acids.

In a representative operation, the feces of one to six calves was collected having internal parasite infection and yielding a combined nematode egg count of 300 or more. Such infections are primarly Haemonchus spp., Trichostrongylus spp. and Cooperia spp. Usually Ostertagia spp., Esophogostomum spp. and Bunostomum spp. are also present. All are naturally occurring infections.

15 milligrams of carbanilic acid: o-fluoro-, allyl ester was added to 10 grams of such feces with silica gel in a waxed paper cup; this was mixed about 20 seconds with a kitchen model electric mixer, which results in a 300 parts per million (p.p.m.) concentration by weight of the compound. Approximately 2 grams of the mixture was spread on six ply 2 x 3 inch gauze pads and placed in clear, two-ounce wide mouth bottles and incubated at 26°–28° C. for five days. One milliliter of distilled water was added as needed during the incubation period to maintain moist cultures.

Cultures are examined after five days with a wide field, stereoscopic disecting microscope, and the presence or absence of larvae is noted.

The same procedure is repeated except that none of the compound is added to the feces; this results in a control sample.

In such a test, it was discovered that carbanilic acid: o-fluoro-, allyl ester gives 100 percent kill and control of the aforementioned internal parasites.

PREPARATION OF STARTING MATERIALS

The o-fluoroisocyanate used in the synthesis of the compound of the present invention can be prepared by first reacting o-fluorobenzoyl chloride with a 100 percent excess of sodium azide to form o-fluorobenzoylazide. This is then heated for one-half hour in the presence of benzene to yield o-fluorophenylisocyanate. This procedure was reported in Chemical Abstracts 68, 21618b, Malichenko et al., "Synthesis of Isomeric Flourophenylisocyanates," Zn. Obshch Khim, 37(8), 1967 (Russ.).

We claim:
1. The compound that is carbanilic acid: o-fluoro-, allyl ester.

References Cited
UNITED STATES PATENTS

| 3,515,744 | 6/1970 | Steinbrunn et al. | 260—471 C |
| 2,556,437 | 6/1951 | Mowry et al. | 260—471 C |
| 3,253,904 | 5/1966 | Harrison | 260—471 C |

VIVIAN GARNER, Primary Examiner

U.S. Cl. X.R.

424—300